(12) United States Patent
Rekimoto

(10) Patent No.: US 6,567,068 B2
(45) Date of Patent: *May 20, 2003

(54) INFORMATION PROCESSING DEVICE AND METHOD

(75) Inventor: Junichi Rekimoto, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,389

(22) Filed: Jul. 29, 1997

(65) Prior Publication Data

US 2001/0048423 A1 Dec. 6, 2001

(30) Foreign Application Priority Data

Aug. 5, 1996 (JP) ............................................. 8-205610

(51) Int. Cl.$^7$ ................................................ G09G 5/08
(52) U.S. Cl. ....................................... 345/156; 345/158
(58) Field of Search ................................ 345/156, 157, 345/158, 162, 169, 172, 901

(56) References Cited

U.S. PATENT DOCUMENTS

| | | | | |
|---|---|---|---|---|
| 4,542,377 A | * | 9/1985 | Hagen et al. | 345/126 |
| 4,839,838 A | * | 6/1989 | Labiche et al. | 364/709.11 |
| 5,262,777 A | * | 11/1993 | Low et al. | 178/18.01 |
| 5,440,326 A | * | 8/1995 | Quinn | 345/157 |
| 5,453,758 A | * | 9/1995 | Sato et al. | 345/156 |
| 5,528,265 A | * | 6/1996 | Harrison | 345/163 |
| 5,602,566 A | | 2/1997 | Motosyuku et al. | 345/123 |
| 5,719,799 A | * | 2/1998 | Isashi | 345/169 |

FOREIGN PATENT DOCUMENTS

| | | | |
|---|---|---|---|
| EP | 0357323 A2 | 3/1990 | G11B/7/095 |
| EP | 0742552 A2 | 11/1996 | G11B/7/085 |
| JP | 7-64754 | 3/1995 | G06F/3/14 |
| WO | WO 94/11980 | 5/1994 | H04M/11/00 |

OTHER PUBLICATIONS

Patent Abstracts of Japan, vol. 16, No. 547 (P-1452), JP 4-205821, Published Jul. 28, 1992, Hitachi Ltd.
Patent Abstracts of Japan, vol. 096, No. 002, JP 7-287689, Published Oct. 31, 1995, Matsushita Electric Ind. Co. Ltd.
IBM Technical Disclosure Bulletin, vol. 37, No. 02B, Feb. 1994, "Personal Computer with Integrated Global Positioning System," pp. 313–314.

* cited by examiner

*Primary Examiner*—Vijay Shankar
(74) *Attorney, Agent, or Firm*—Bell, Boyd & Lloyd LLC

(57) ABSTRACT

In an information processing device, when an operation button is pushed, a menu is displayed on the screen of an LCD. When the whole portable type information processing device (PDA) is rotated around the X-axis, the Y-axis or the Z-axis with the operation button being pushed, the rotation is detected by a triaxial gyro sensor, and on the basis of the detection result a cursor displayed on the screen is moved on the menu. By releasing the operation button when the cursor is located on a desired menu item, the selection of the menu item at which the cursor is located is settled, and the processing corresponding to the selected menu item is started.

80 Claims, 13 Drawing Sheets

ND METHOD

INFORMATION PROCESSING DEVICE AND METHOD

BACKGROUND OF THE INVENTION

The present invention relates to information processing device and method for inputting information by holding and rotating the overall device with one hand.

In a portable information device such as an electronic pocket notebook, a pocket telephone, a pocket beeper or the like, a button, a pen, a touch panel or the like has been conventionally used as an information input means. For example, in an electronic pocket notebook, the body of the device is held by one hand while a pen is held by the other hand, and a touch panel on the device is operated with the pen to input prescribed information.

Further, in a pocket telephone, numeral keys for inputting a telephone number and functional buttons corresponding to the respective functions are provided to perform prescribed operations. In a pocket beeper or the like, an indispensable minimum number of functional buttons corresponding to the respective functions are provided, and these buttons are operated.

However, in the case of a portable information device such as a electronic pocket notebook for inputting information by using a pen and a touch panel, the device body provided with the touch panel must be held by one hand while the pen is held by the other hand, and thus both the hands must be used for the operation. Therefore, it has a problem that the operability thereof is difficult in some cases. For example, it is difficult to operate the portable device while baggage is held by one hand.

Devices such as the pocket telephone have a problem in that numeral keys for inputting a telephone number occupy a large space, and thus they prevent a compact design.

SUMMARY OF THE INVENTION

The present invention has been implemented in view of such a situation, and has an object to provide an information processing device which can reduce the number of operation buttons and can be readily handled even by one hand.

In order to attain the above object, an information processing device according to one aspect to one aspect of the present invention includes means which is provided in a portable-size housing and adapted to display information; detection means which is provided in the housing and adapted to detect the displacement of the attitude of the housing due to rotation of the whole housing; instructing means which is provided and operated when display of selected information on the display means is instructed and when desired information is selected from the displayed selection information; and processing means which is provided in the housing and adapted to display on the display means the selection information corresponding to the displacement detected by the detection means in accordance with the operation of the instructing means, and to perform the processing relating to the selection information which is selected from the selection information displayed on the display means by the instructing means.

Another aspect of the present invention includes an information processing method for use in an information processing device comprising a portable-sized housing, and display means for displaying information, detection means for detecting the displacement of the attitude of said housing due to rotation of the whole housing and instructing means for performing predetermined instructions which are provided in the housing, wherein the method includes steps of displaying on the display means the selection information corresponding to the displacement detected by the detection means, and when desired information is selected from the selection information displayed on the display means by the operation of the instructing means, performing the processing relating to the selected selection information.

DETAILED DESCRIPTION OF THE PREFERRED EMBODIMENT

A preferred embodiment according to the present invention will be described with reference to the accompanying drawings.

Figure 1:
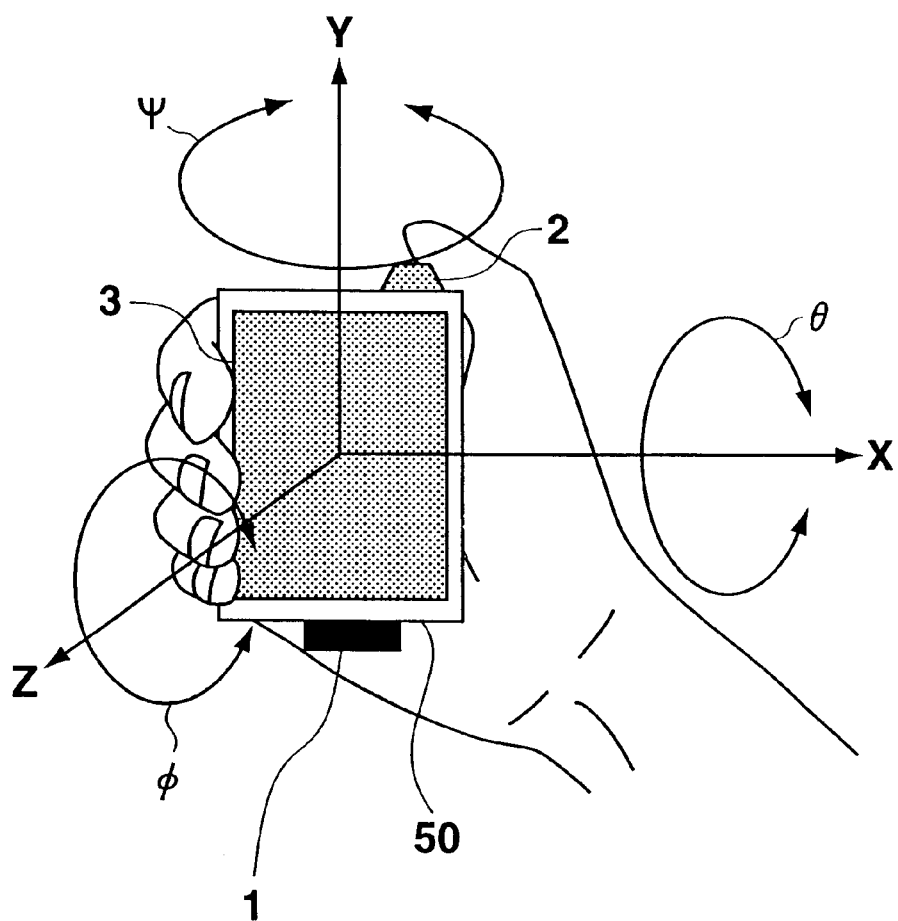
FIG. 1 is a diagram showing the outside of a portable type information processing device to which an input device of the present invention is applied.

FIG. 1 is a diagram showing the outside of a portable information processing device (PDA: personal digital assistant) 50 to which the present invention is applied. A triaxial gyro sensor 1 (detection means) 1 detects each rotational angle when the whole device is rotated around the X-axis, the Y-axis and the Z-axis. An operation button 2 (instructing means) is designed to make a predetermined instruction to the device. An LCD 3 (display means) is designed to display images such as a menu frame, a map, etc.

Figure 2:
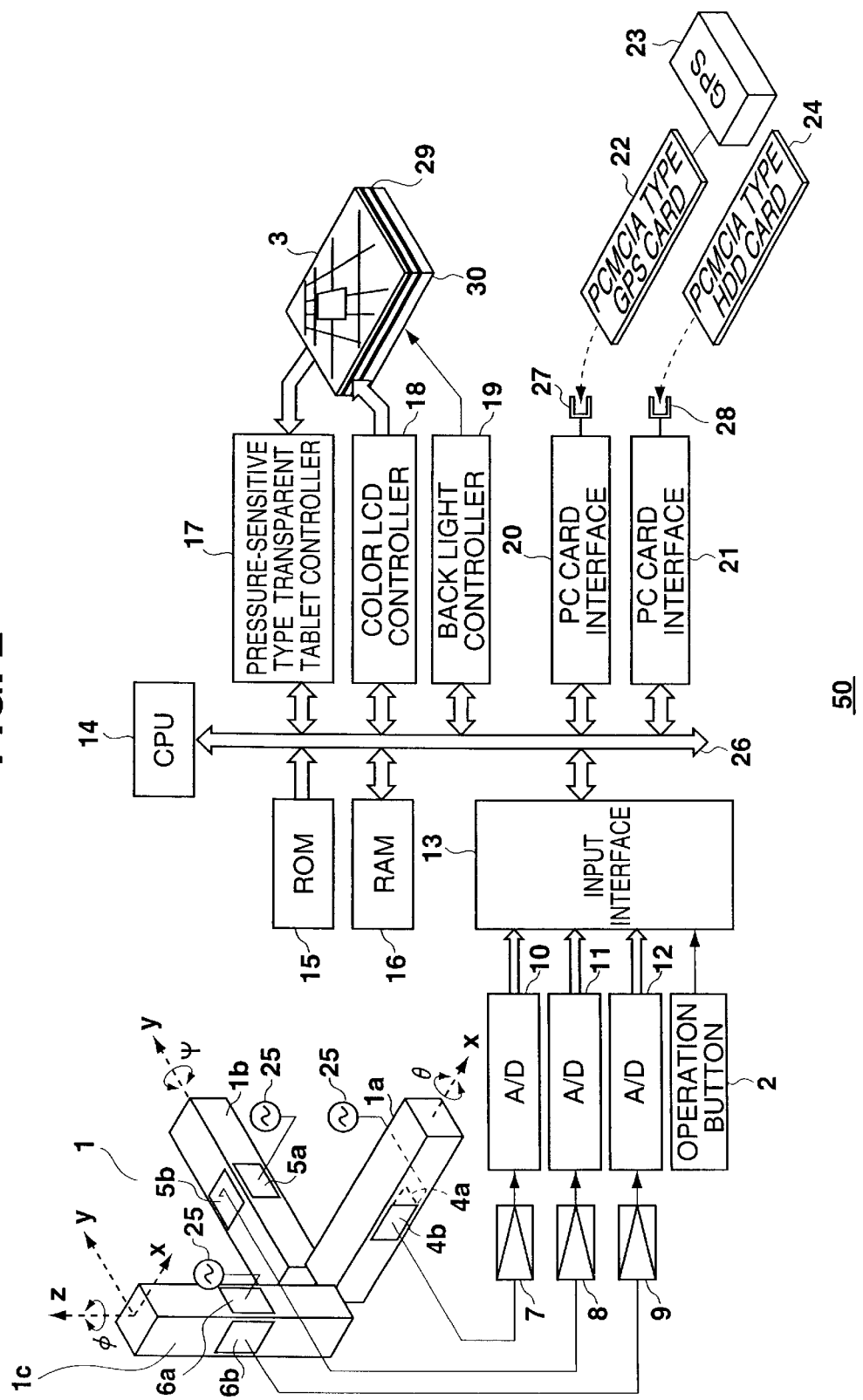
FIG. 2 is a block diagram showing the internal construction of the portable type information processing device shown in FIG. 1.

FIG. 2 is a block diagram showing the construction of the inside of the PDA 50 shown in FIG. 1. The triaxial gyro sensor 1 comprises vibrational gyros 1a, 1b and 1c which correspond to the respective coordinate axes of the X-axis, the Y-axis and the Z-axis.

The vibrational gyro has such a characteristic that when a rotational angular velocity is applied to a vibrating object, Coriolis force occurs in the direction perpendicular to the vibration direction, and the Coriolis force F is represented as follows.

$$F=2mv\omega$$

(m represents mass, v represents velocity and ω represents angular velocity)

Accordingly, the angular velocity ω is proportional to the Coriolis force F, and thus the rotational angular velocity can be detected by detecting the Coriolis force F.

The vibrational gyro 1a is provided with a driving piezoelectric ceramic 4a and a detecting piezoelectric ceramic 4b, and an alternating signal which is an oscillation output of an oscillator 25 is applied to the driving piezoelectric ceramic 4a. In this state, when the vibrational gyro 1a is rotated in θ direction, Coriolis force F is applied to the detection piezoelectric ceramic 4b to generate a voltage E.

A minute voltage output from the detecting piezoelectric ceramic 4b is amplified by an amplifier 7, and converted to digital data in an A/D converter 10.

The angular velocity ω applied to the vibrational gyro 1a and the generated voltage E are proportional to each other. For example, the vibrational gyro 1a is arranged so that the voltage E increases when it is rotated clockwise around the X-axis while the voltage E decreases when it is rotated counterclockwise.

The vibrational gyros 1b and 1c have basically the same effect as the vibrational gyro 1a. That is, the angular velocity around the Y-axis is detected by the vibrational gyro 1b, and the output thereof is amplified in an amplifier 8, and then converted to digital data in an A/D converter 11. Likewise, the angular velocity around the Z-axis is detected by the vibrational gyro 1c, and the output thereof is amplified in an amplifier 9 and then converted to digital data in an A/D converter 12.

The operation button 2 produces a predetermined signal in accordance with an users's operation, and the signal is supplied to an input interface 13. A CPU 14 (processing means) is connected through a bus 26 to various types of ICs. Not only system programs of the whole device, but also other programs can be stored in ROM 15, such as, Katakana/Kanji conversion programs for word processor functions and a dictionary table therefor, or a recognizing program for handwriting input and a dictionary table therefor. Data necessary for operations are stored in a RAM 16 at all times.

The LCD 3 is designed to perform a predetermined display under the control of a color LCD controller 18. A pressure-sensitive type transparent tablet 29 detects a predetermined input under the control of a pressure-sensitive type transparent tablet controller 17. A back light 30 irradiates light from the back side through the pressure-sensitive type transparent tablet to the LCD 3 under the control of a back light controller 19.

A PC card interface 20 is provided with a connector 27, and a PCMCIA type GPS card meeting the standards of PCMCIA (Personal Computer Memory Card International Association) as a GPS (Global Positioning System) device (hereinafter merely abbreviated to "GPS card") 22 (position detection means) is inserted. A CPU 14 transmits and received data, programs, etc., to and from the GPS card 22 through the PC card interface 20. Further, the GPS card 22 is connected to a GPS antenna 23 which receives the electric wave from a GPS satellite and outputs the corresponding signal. The GPS card 22 detects the current position on the basis of the signal received by the GPS antenna 23, and outputs the position data corresponding to the current position.

The PC card interface 21 is provided with a connector 28, and it is connected to the PCMCIA type hard disc card (hereinafter merely abbreviated to HDD card) 24 (storage means) as a storage device, for example. Map data, etc. are stored in the HDD card 24.

The input interface 13 supplies through the bus 26 to the CPU 14 a detection signal of the triaxial gyro sensor 1 which is supplied from the A/D converters 10 to 12. Further, it supplies through the bus 26 to the CPU 14 the signal corresponding to a predetermined operation which is supplied from the operation button 2.

Next, the operation when the menu selection is performed by using the PDA 50 thus constructed will be described with reference to FIGS. 3 and 4. When this operation is performed, the data on the current position are not needed, and thus it is unnecessary to insert the GPS card 22 into the connector 27 of the PC card interface 20 in FIG. 2. Further, no map data are needed, and thus it is unnecessary to insert the HDD card 24 into the connector 28.

Figure 3:
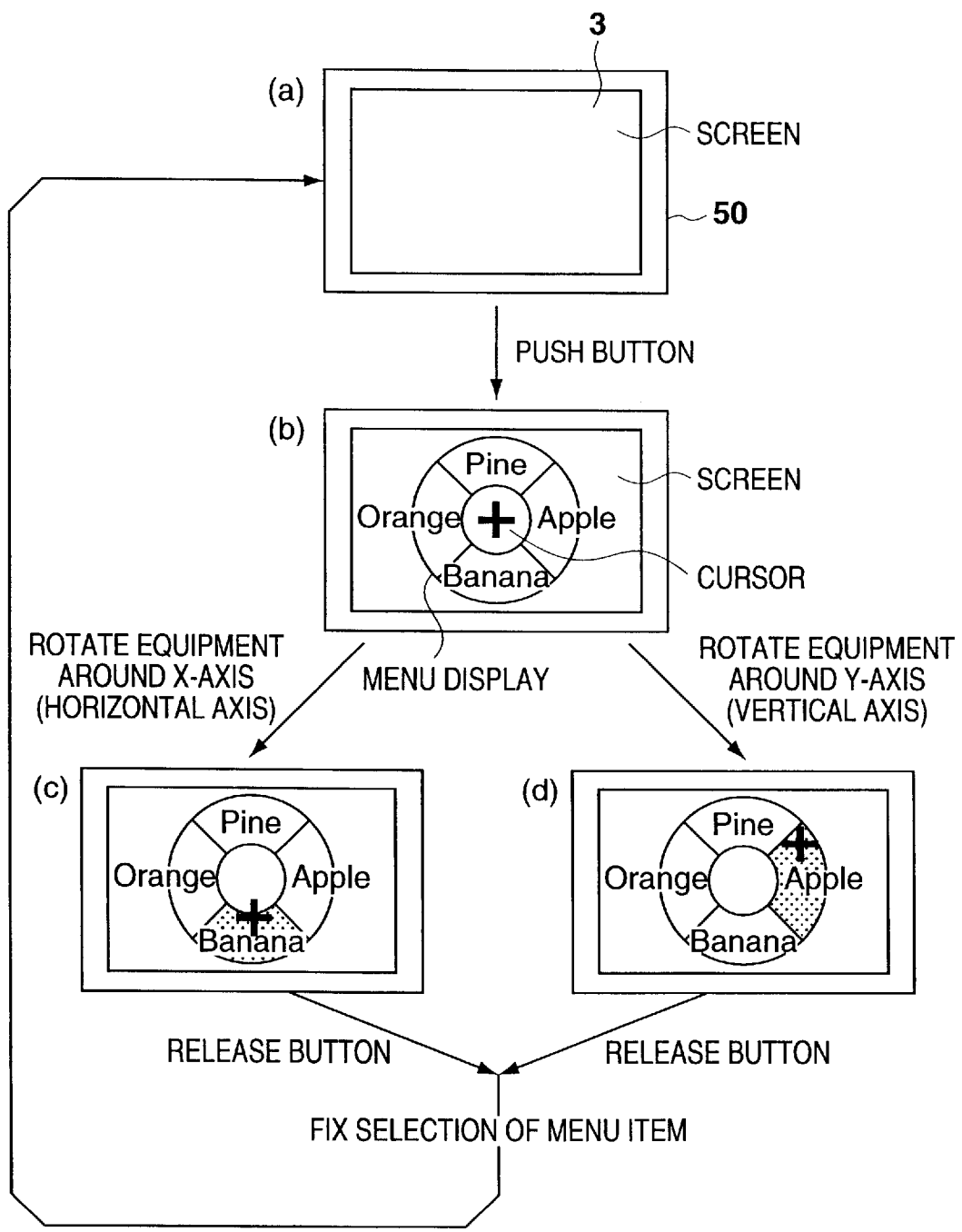
FIG. 3 is a diagram showing a procedure for displaying a ring-shaped menu and selecting a menu item.
Figure 4:
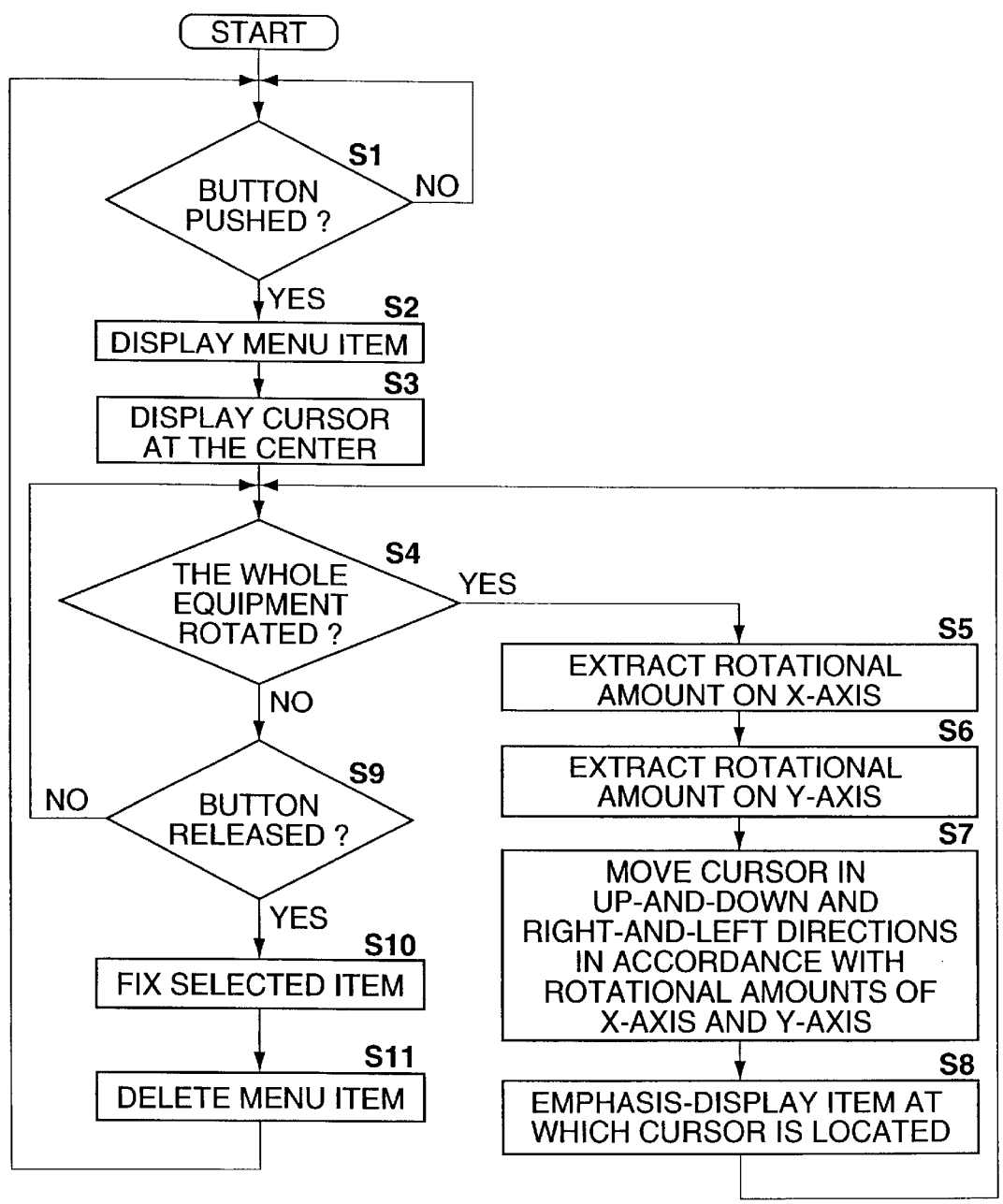
FIG. 4 is a flowchart showing the procedure for selecting a menu item of a ring-shaped menu of FIG. 3.

FIG. 3 shows a series of operation frames when the menu selection is performed, and FIG. 4 is a flowchart showing the operation procedure. First, in step S1 of FIG. 4, the CPU 14 judges whether the operation button 2 is pushed down by a user. At this time, no display is made on the screen of the PDA 50 as shown in (a) of FIG. 3(a).

When the operation button 2 is pushed by the user, a predetermined signal is generated, and supplied through the input interface 13 and the bus 26 into the CPU 14, whereby the CPU 14 judges the operation of the button 2, and goes to step S2. On the other hand, when the button 2, is not operated by the user, the processing of the step S1 is repeated.

In step S2 the CPU 14 generates the display data (bit map data) corresponding to a predetermined menu, and supplies the display data through the bus 26 to the color LCD controller 18 together with the data corresponding to a display position on the screen. Alternatively, the bit map data corresponding to the menu may be previously stored in the ROM 15, and then read out through the bus 26 and supplied to the color LCD controller 18.

The color LCD controller 18 has a VRAM (video RAM) not shown, and controls the LCD 3 according to the data written in the VRAM to display a predetermined image. Accordingly, the display data corresponding to the predetermined menu which is supplied from the CPU 14 are stored in the VRAM of the color LCD controller. The color LCD controller 18 supplies a control signal to the LCD 3 in accordance with the display data stored in the VRAM to thereby display the predetermined menu.

Next, in step S3, for example, the CPU 14 reads out the display data corresponding to a predetermined cursor from the ROM 15 and supplies the display data to the color LCD controller 18 together with the data corresponding to the display position on the screen. The color LCD controller 18 stores into the VRAM the display data corresponding to the cursor supplied from the CPU 14, and controls the LCD 3 in accordance with the display data stored in the VRAM.

As a result, as shown in (b) of FIG. 3, a predetermined menu and a predetermined cursor (in this case, it has a cross shape) are displayed on the screen of the LCD 3. In this case, the cursor is first displayed on the center of the menu.

Next, the process goes to step S4, and the CPU 14 judges whether the whole device (PDA) 50 is rotated. For example, when the user rotates the whole device around the X-axis while held by one hand as shown in FIG. 1, a predetermined voltage is generated in the detecting piezoelectric ceramics 4b due to the rotation, and it is amplified in the amplifier 7 and converted to digital data in the A/D converter 10. The digital data are input through the input interface 13 and supplied through the bus 26 to the CPU 14, whereby the CPU 14 can recognize the rotation of the whole device around the X-axis. The process occurs in response to rotation around the Y-axis rotation around the Z-axis.

In step S4, when it is judged that the whole device is rotated, the CPU 14 goes to step S5 to determine the rotational amount around the X-axis. In step S7, the cursor is moved up, down, right or left in accordance with the respective amounts of rotation around the X-axis in step 5 and the Y-axis in step S6.

That is, in order to move the cursor in the upward and downward directions and the right and left directions in accordance with the rotation of the whole device, the bit map data corresponding to the cursor and the data corresponding to the display position to which the cursor currently displayed on the screen is displaced in the upward and downward directions and the right and left directions, are supplied to the color LCD controller 18. The magnitude of the displacement of the display position corresponds to each output voltage of the detecting piezoelectric ceramics 4b and, 5b. The color LCD controller 18 stores the bit map data supplied from the CPU into a predetermined place of the VRAM on the basis of the data corresponding to the display position.

The color LCD controller 18 controls the LCD 3 in accordance with the bit map data corresponding to the cursor after the cursor is moved, which are stored in the VRAM. With this operation, when the whole device is rotated around the X-axis in such a state that the cursor is first located at the center of the screen as shown in (b) of FIG. 3, the cursor is moved to an item "Banana" as shown in (c) of FIG. 3, for example. Further, when the whole dance is rotated around the Y-axis in such a state that the cursor is first located at the center of the screen as shown in (b) of FIG. 3, the cursor is moved to an item "Apple" as shown in (d) of FIG. 3, for example.

Next, the CPU 14 goes to step 8. When the cursor is located at any one of the menu items, the CPU 14 generates the display data corresponding to the menu for which the display of the menu item is emphasized, and supplies the display data to the color LCD controller 18. For example, when the cursor is located at the menu item "Banana" as shown in (c) of FIG. 3, the CPU 14 generates display data corresponding to the menu for which the menu item "Banana" is displayed while emphasized, and supplies the display data to the color LCD controller 18.

With this operation, the color LCD controller 18 stores into the VRAM the display data corresponding to the menu for which the display of the menu item "Banana" at which the cursor is located is emphasized. In accordance with the display data stored in the VRAM, the color LCD controller 18 controls the LCD 3, and displays the from in which the menus item "Banana" is emphasis-displayed.

For example, when the cursor is located at the menu item "Apple" as shown in (d) of FIG. 3, the display data corresponding to the menu for which the menu item "Apple" is emphasis-displayed are generated, and supplied to the color LCD controller 18.

With this operation, the color LCD controller 18 stores in the VRAM the display data corresponding to the menu for which the menu item "Apple" at which the cursor is located is emphasis-displayed. In accordance with the display data stored in the VRAM, the color LCD controller 18 controls the LCD 3, and displays the frame in which the menu item "Apple" is emphasis-displayed.

When the processing in step S8 is finished, the CPU 14 returns the step S4 to repeat the processing subsequent to the step S4.

When it is judged in step S4 that the whole equipment is not rotated, the CPU 14 goes to step S9 to judge whether the operation button 2 is released. If it is judged that the operation button 2 is not released, the CPU returns to the step S4 to repeat the processing subsequently to the step S4. On the other hand, when the operation button 2 is released in such a state that such a frame as shown in (d) FIG. 4 is displayed, it is judged in step S9 that the operation button 2 is released, and the CPU goes to step S10 to fix the selection of the emphasis-displayed menu item.

With this operation, in step S11 the menu is deleted from the screen, the CPU returns to the step S1 to repeat the processing subsequent to the step S1.

By holding the whole device with one hand and rotating it around the X-axis and the Y-axis as described above, a prescribed menu item can be selected. The foregoing section described the case of rotation around the X-axis and the Y-axis. However, it is needless to say that the selection of the menu item can be performed by rotating the whole device around the X-axis the Y-axis and the Z-axis.

Figure 5:
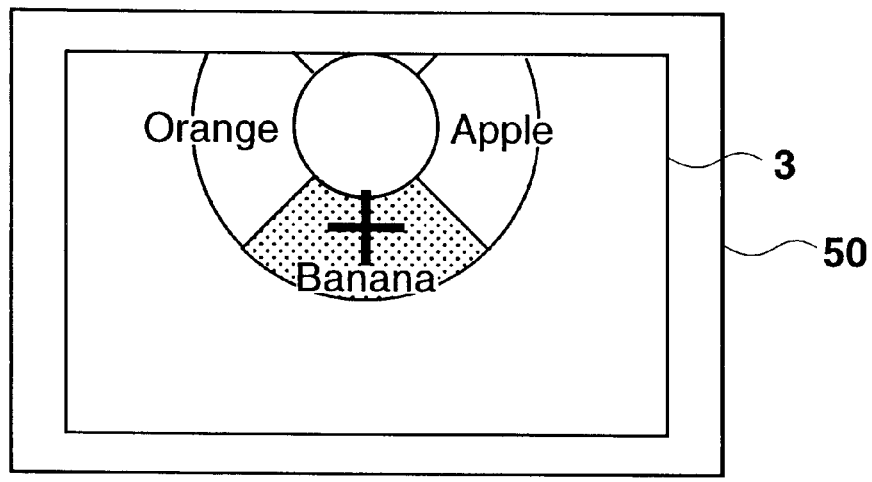
FIG. 5 is a diagram showing a menu frame in which a cursor is fixed and a ring-shaped menu is moved.

Further, in this embodiment, when the device is rotated, the cursor is moved on the menu to select a prescribed menu item. However, the cursor could be fixed at a predetermined position, for example, at the center as shown in FIG. 5, and the menu could be moved within the frame when the device is rotated. With this operation, a prescribed menu item could be selected.

Figure 6:
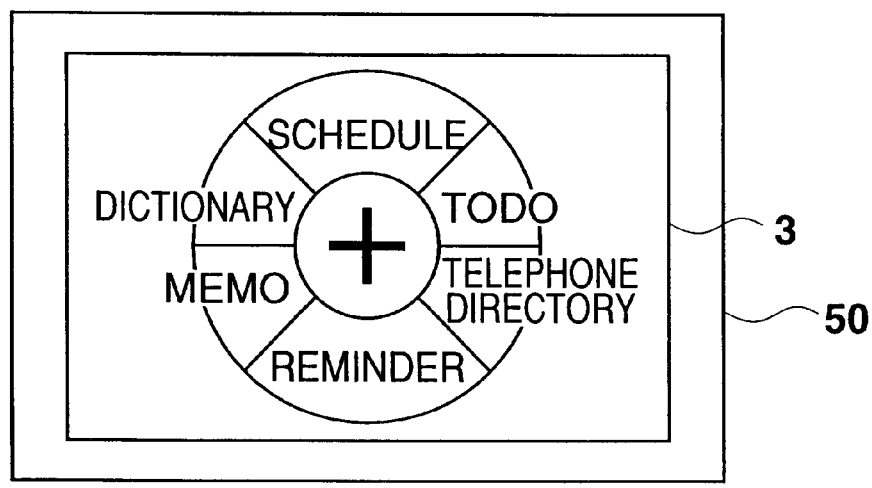
FIG. 6 is a diagram showing a menu frame which is displayed in an electronic notebook.

FIG. 6 shows a display example of the LCD 3 when the present invention is applied to an electronic notebook For example, the electronic notebook is held by one hand, and a ring-shaped menu is displayed by pushing down the operation button 2. In this case, the menu items used in the electronic notebook, for example, "schedule", "dictionary", "memo", "reminder", "telephone directory", "TO DO (matters to be done)", etc. are displayed, for example, and the cursor is displayed at the center of the screen.

Subsequently, by rotating the whole electronic notebook around the X-axis and the Y-axis while pushing the operation button 2, the cursor is moved to a prescribed menu item. When the operation button 2 is released while the cursor is located at a desired menu item, the selection of the menu item at which the cursor is located is fixed.

As described above, the electronic notebook can be operated by one hand to select the menu item. Further, in place of the above menu, a menu containing numerals, alphabets, Hirangana or Katakana or the like as menu items may be displayed, and a telephone number, a sentence, or the like may be input by selecting a desired numeral or character with the cursor.

Figure 7:
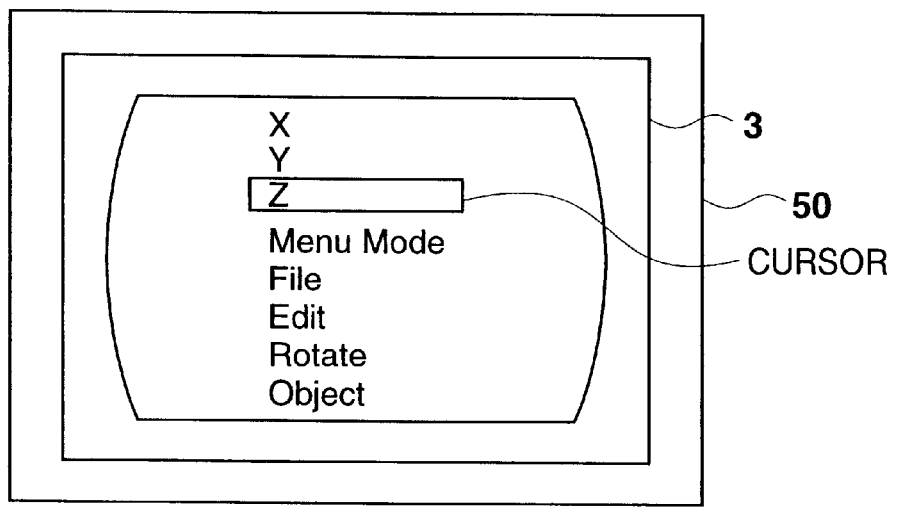
FIG. 7 is a diagram showing a state in which a ring-shaped menu is displayed and a menu item is selected.

FIG. 7 shows an example of a drum-shaped menu. Menu items are displayed as if they are arranged on a drum, and a rectangular cursor is displayed on a predetermined position. First, a user pushes the operation button 2, and then rotates the device around the X-axis, whereby the drum is rotated. When a desired menu is moved to the inside of the cursor, the operation button 2 is released. As described above, a desired menu item of the drum-shaped menu can be selected and fixed.

Next, the case where a digital map is displayed by using the PDA 50 thus constructed will be described with reference to FIGS. 8 to 13. When this display is carried out, data on the current location are needed, and thus the GPS card 22 is inserted into the connector 27 of the PC card interface 20 in FIG. 2, whereby the current location can be calculated on the basis of the electric wave from the GPS satellite which is received by the GPS antenna 23. Further, the HDD card 24 is inserted into the connector 28 to allow map data to be read out.

Figure 8:
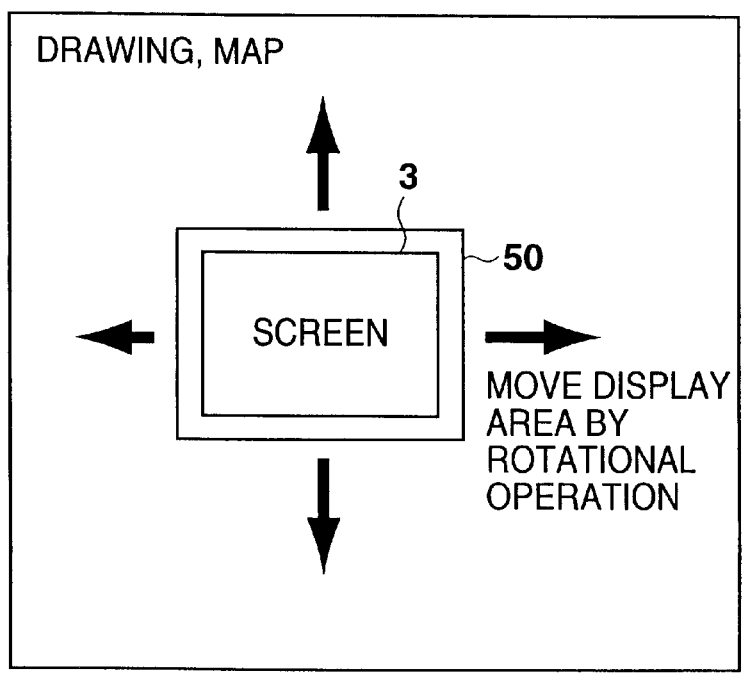
FIG. 8 is a diagram showing a movement on a virtual map and display of any portion of a map on a screen.

FIG. 8 is a conceptual diagram showing that a prescribed area such as a virtual map, a drawing or the like is displayed on the screen by applying a rotational operation on the PDA 50. In the PDA 50, the map data are stored in the HDD card 24, and the CPU 14 reads out the map data through the PC card interface 21 from the HDD card 24. The read-out map data are subjected to coordinate conversion processing to perform a bird's eye view map display which will be described later with reference to FIGS. 14 to 16, thereby generating the bit map data corresponding to the map data which have been subjected to the coordinate conversion processing, and then the bit map data are supplied to the color LCD controller 18.

The color LCD controller 18 stores the bit map data supplied from the CPU 14 into the VRAM. The color LCD controller 18 controls the LCD 3 on the basis of the bit map data stored in the VRAM, and displays the map corresponding to the bit map data. As described above, the area corresponding to the current position in a prescribed map can be displayed. In this case, the map data corresponding to the current position which is supplied from the GPS card 22 are read out from the HDD card 24, and displayed by the LCD 31.

For example, when the user pushes the operation button 2 and the PDA 50 is rotated around the horizontal axis (X-axis) to the screen while the map of the current position is displayed on the screen of the PDA 50, a prescribed voltage is generated in the detecting piezoelectric ceramic 4b. The voltage is amplified by the amplifier 7, and converted to digital data in the A/D converter 10. Thereafter, the digital data are supplied through the bus 26 into the CPU 14, whereby the CPU 14 recognizes that the PDA 50 is rotated around the X-axis.

Subsequently, bit map data corresponding to map data which are displaced upwardly or downwardly from a portion currently-displayed on the screen of the LCD 3 are generated on the basis of the map data read out from the HDD card 24 so that the map displayed on the LCD 3 is moved upwardly or downwardly, and then supplied to the color LCD controller 18.

The color LCD controller 18 temporarily stores into the VRAM the bit map data supplied from the CPU 14. Subsequently, it controls the LCD 3 in accordance with the bit map data stored in the VRAM to display the corresponding map, whereby the map displayed on the screen of the LCD 3 of the PDA 50 is moved upwardly and downwardly in accordance with the rotational operation by the user. The movement amount corresponds to the rotational angle of the PDA 50.

Further, when the PDS 50 is rotated around the axis (Y-axis) perpendicular to the screen while the operation button 2 is pushed, a voltage is generated by the detecting piezoelectric ceramic 5b at this time, and thus the CPU 14 recognizes that the rotational operation around the Y-axis is performed.

Subsequently, on the basis of the map data read out from the HDD card 24, the CPU 14 generates the bit map data corresponding to the map data which are displaced in the left or right direction from a portion currently-displayed on the LCD 3 so that the map displayed on the LCD 3 is moved in the left direction or the right direction, and supplies the data to the color LCD controller 18.

The color LCD controller 18 temporarily stores the bit map data supplied from the CPU 14 into the VRAM. Subsequently, in accordance with the bit map data stored in the VRAM, the color LCD controller 18 controls the LCD 3 to display the corresponding map. Accordingly, the map displayed on the screen of the LCD 3 of the PDA 50 is moved in the right and left direction in accordance with the rotating operation of the user. The movement amount corresponds to the rotational angle of the PDA 50.

Further, by combining the above rotating operation, any portion of the map can be displayed on the screen of the LCD 3. When the operation button 2 is released (cancel) in a state that a predetermined area of the map is displayed as described above, the map of the area which is currently displayed is fixed, and the map of the portion is displayed on the screen continuously thereafter. The rotating operation around the X-axis and the rotating operation around the Y-axis can be performed at the same time.

Figure 9:
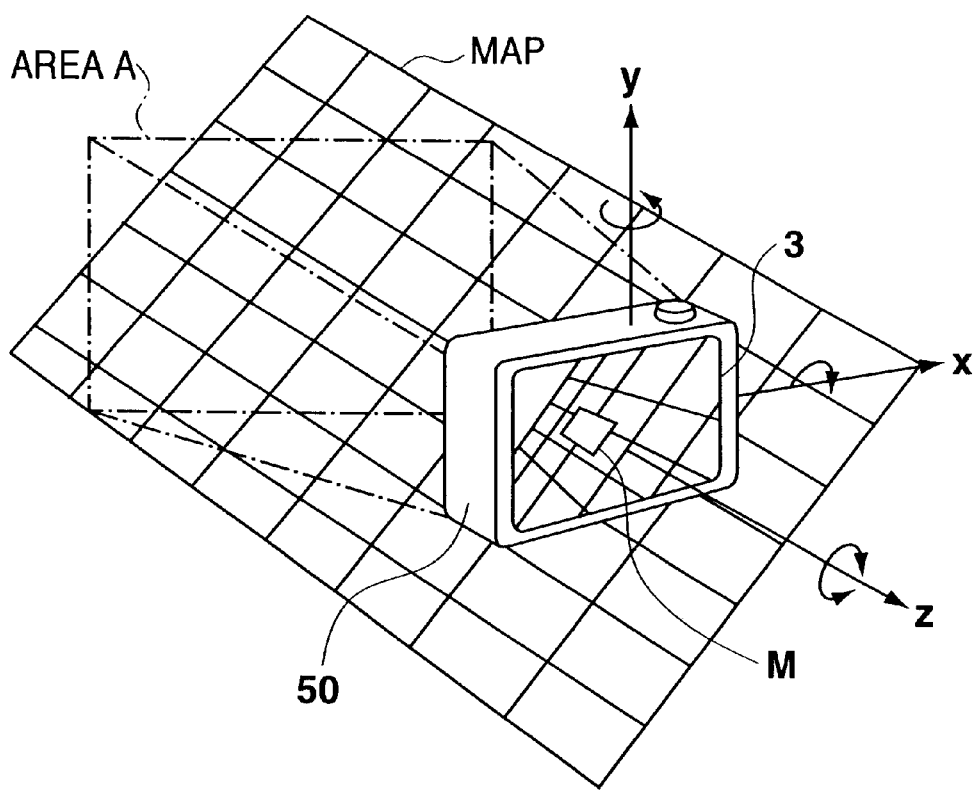
FIG. 9 is a diagram showing the state that a virtual map is viewed obliquely from the sky.
Figure 10:
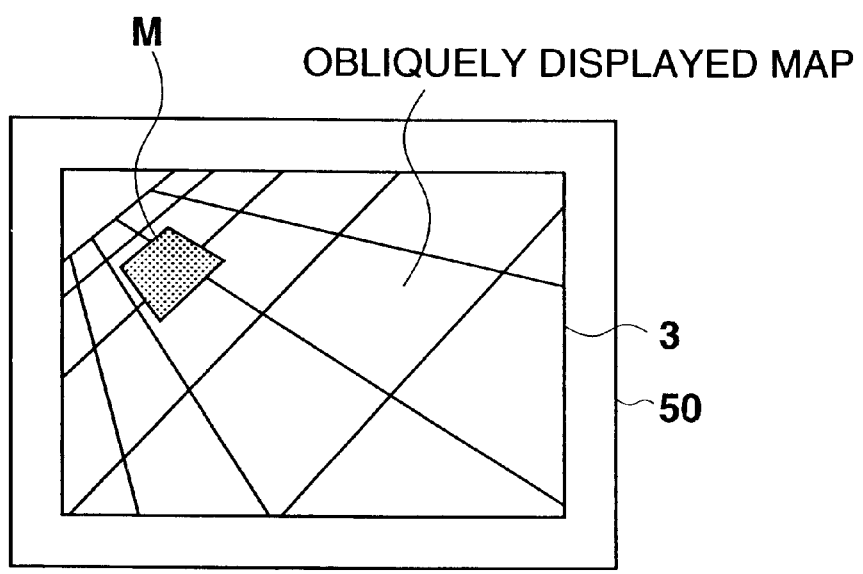
FIG. 10 is a diagram showing a frame which is displayed on the LCD 3 of the PDA 50 in FIG. 9.

FIG. 9 shows a state that the PDA 50 is located in a slant position to a virtual map. When viewing the virtual map which is located at the back surface of the screen of the LCD 3 from the direction (Z-axis direction) perpendicular to the screen of the LCD 3 of the PDA 50, an area A on the map can be observed. Therefore, a map as shown in FIG. 10 is displayed on the LCD 3 of the PDA 50. Accordingly, such an image as if the map is actually broadened and it is viewed from various angles can be displayed on the screen.

Further, an index M which represents a next moving destination M can be displayed as shown in FIGS. 9 and 10. Accordingly, the user can recognize the place on the map to which the user is moving and thus the user can more easily move to a desired portion on the map. Further, even when the destination is far away, the current display area and the destination can be displayed on the screen at the same time, so that the relationship between the moving destination and the current position can be easily recognized.

Figure 11:
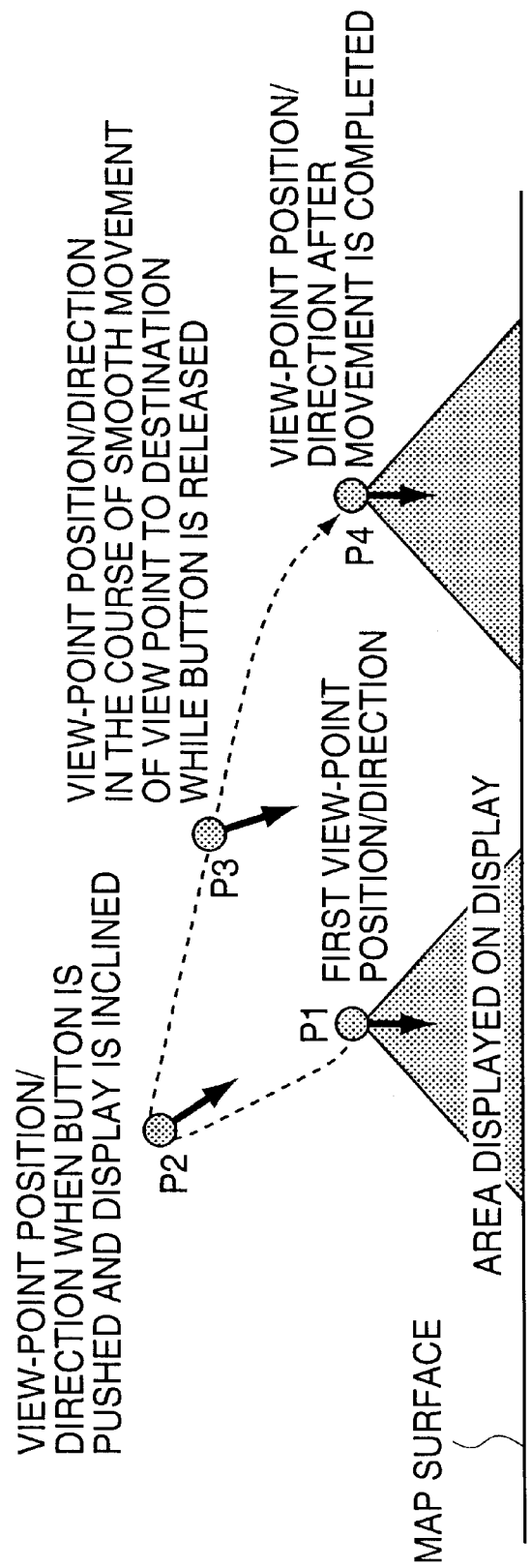
FIG. 11 is a diagram showing the locus view point positions which is viewed from the lateral direction of a virtual map when the view point is moved from the current position to the moving destination on the virtual map.
Figure 12:
FIG. 12 is a frame display when the map is viewed at a view point P1 in FIG. 11.

FIG. 11 is a diagram showing the locus of the PDA 50 moving on the virtual map, which is viewed from the lateral direction of the surface of the map. First, the map is viewed from the top at a view point P1, and a map as shown in FIG. 12 is displayed on the screen of the LCD 3. Subsequently, the operation button 2 of the PDA 50 is pushed, and the PDA 50 is rotated around a predetermined axis, whereby the view point is automatically moved from the view point P1 to a view point P2 which is located at the upper side of the view point P1, and the map can be viewed from an obliquely upper side.

At this time, the whole or part of the area on the map which is viewed at the view point P1 can be located within the screen of the PDA 50. Accordingly, the positional relationship between the current position and the destination can be easily grasped, and a desired moving destination can be quickly found out.

Figure 13:
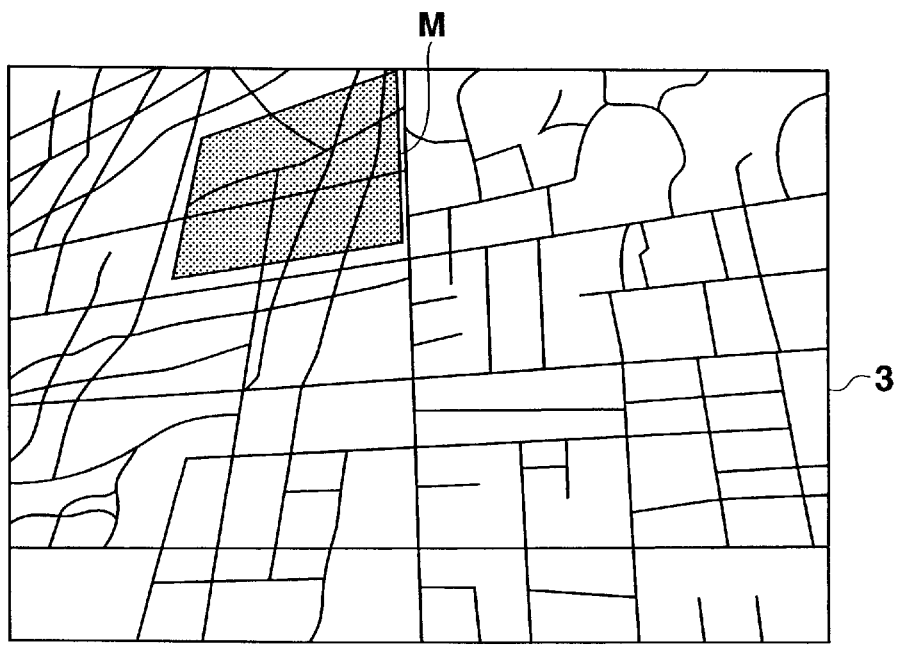
FIG. 13 is a frame display when the map is viewed at a view point P2 in FIG. 11.

At the view point P2, such a bird's eye view as obtained by viewing the virtual map from the obliquely upper side is displayed on the screen of the LCD 3 of the PDA 50 as shown in FIG. 13, and the index M of the destination is displayed. When the operation button 2 is released at the time when the index M is coincident with a desired moving destination, the view point is moved from the view point P2 through the view point P3 to the view point P4. The image obtained by viewing the map from the top at the view point P4 is displayed on the LCD 3 of the PDA 50.

As described above, the user can easily display a desired place on the map by operating the PDA 50 with one hand.

Next, a bird's eye view display method will be described with reference to FIGS. 14 to 16. This is the method for displaying a map as if it is viewed from the sky, and it has been recently used for a navigation device, etc. to display the detailed condition of roads around a display fiducial point at which the vehicle is located, and also display the condition of far roads.

Figure 14:
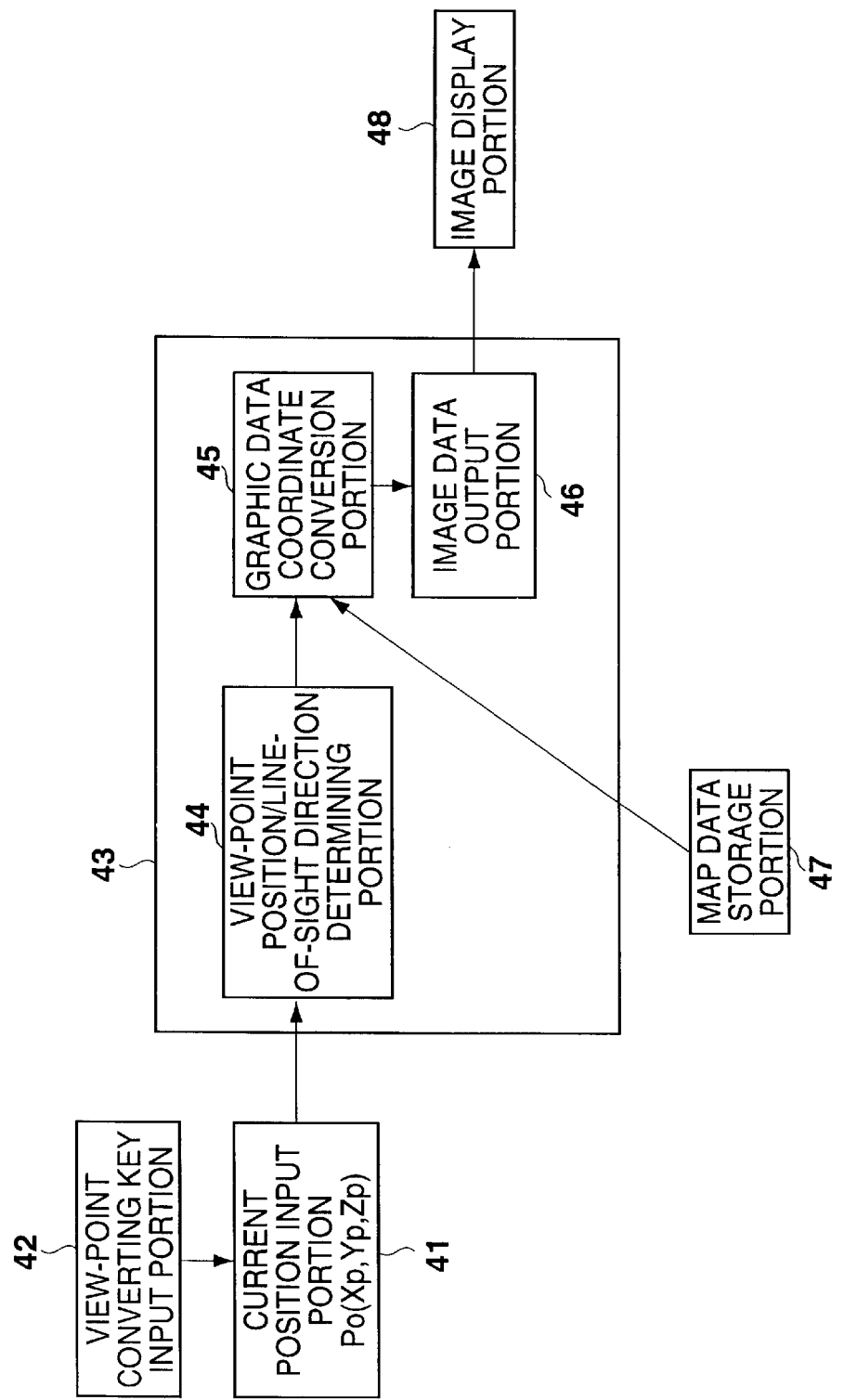
FIG. 14 is a block diagram showing the general construction of a system for performing bird's eye view display processing.

FIG. 14 shows the construction of a general system which implements the bird's eye view display. The system comprises a current position input portion 41 for inputting the current position $P_o$ ($X_p$, $Y_p$, $Z_p$), a view-point converting key input portion 42 for changing the current position, a bird's eye view display calculation portion 43 which comprises a view-point position/line-of-sight direction determining portion 44 for determining the view-point position/line-of-sight direction on the basis of information from the current position input portion 41, a graphic data coordinate converting portion 45 for converting the coordinate of graphic data on the basis of the information from the view-point position/ling-of-sight direction determining portion 44 and the map information, an image data output portion 46 for outputting image data on the basis of the information from the graphic data coordinate converting portion 45, a map data storage portion 47 for storing each type map information and outputting the stored map information to the graphic data coordinate converting portion 45, and an image display portion 48 for displaying the image corresponding to the image information output form the image data output portion 46.

This system can be implemented by mounting the GPS car 22 in the PDA 50 shown in FIG. 2. That is, the current position input portion 41 corresponds to the GPS card 22, the GPS antenna 23, and the view-point converting key input portion 42 corresponds to the triaxial gyro sensor 1. The view-point position/line-in-sight direction determining portion 44 and the graphic data coordinate conversion portion 45 which constitute the bird's eye view display calculation portion 43 correspond to the CPU 14, and the image data output portion 46 corresponds to the color LCD controller 18. The map data storage portion 47 corresponds to the HDD card 24, and the image display portion 48 corresponds to the LCD 3.

Figure 15:
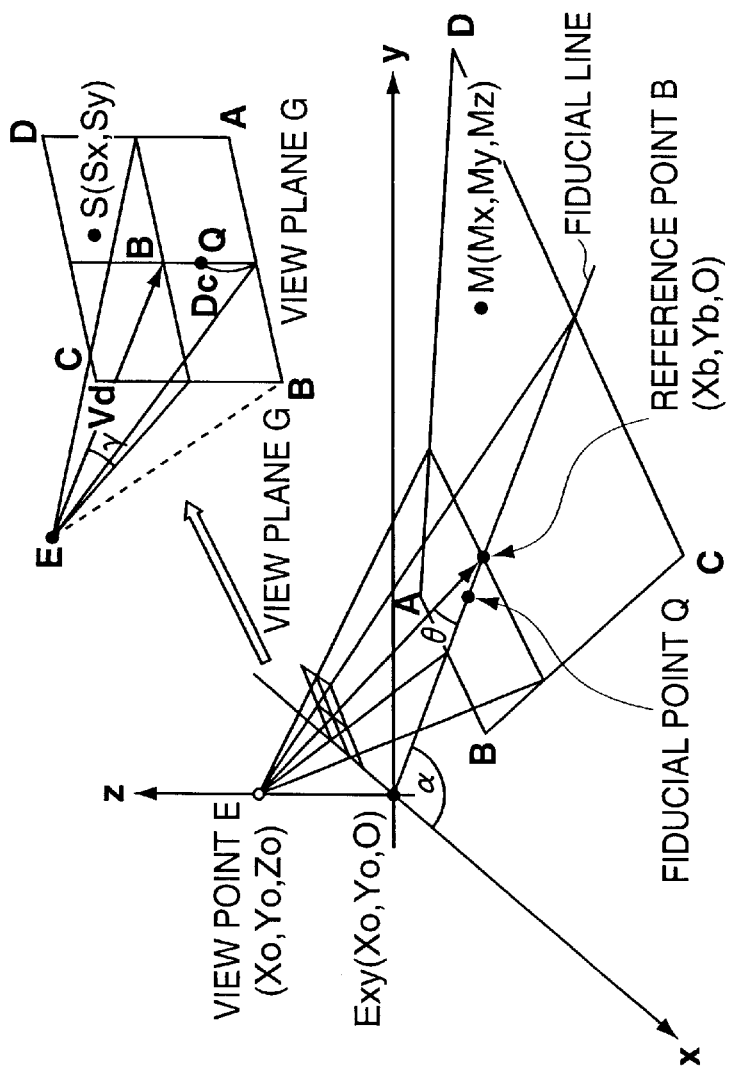
FIG. 15 is a diagram showing the concept of the perspective projection conversion.

As shown in FIG. 15, a map ABCD area which is represented with respect to the XY plane of the XYZ plane is downwardly viewed from a view point E($X_o$, $Y_o$, $Z_o$) to a reference point B ($X_b$, $Y_b$, $Z_b$) by an angle of depression θ to obtain a picture, and then the picture is projected onto a view plane G disposed perpendicularly to the line-of-sight direction. A perspective projection view is obtained by displaying the above projected picture as a bird's eye view on the screen.

In this case, it is assumed that the line-of-sight from the view point E has rotational direction information angle α to the XY plane. The distance between the view point E and the view plane G is represented by $V_d$. On the perspectively-projected display image, a longitudinal line on the center line is set as a reference line, and a point Q which is fixed on the reference line is referred to as a fiducial point of the perspective projection. The fiducial point Q is located on a line connecting the view point E which is assumed to be located on the XY plane and the reference point B (the center on the screen) of the perspective projection, and fiducial point Q is displayed at the distance $D_c$ from the lower side of the display frame toward the reference point B.

Figure 16:
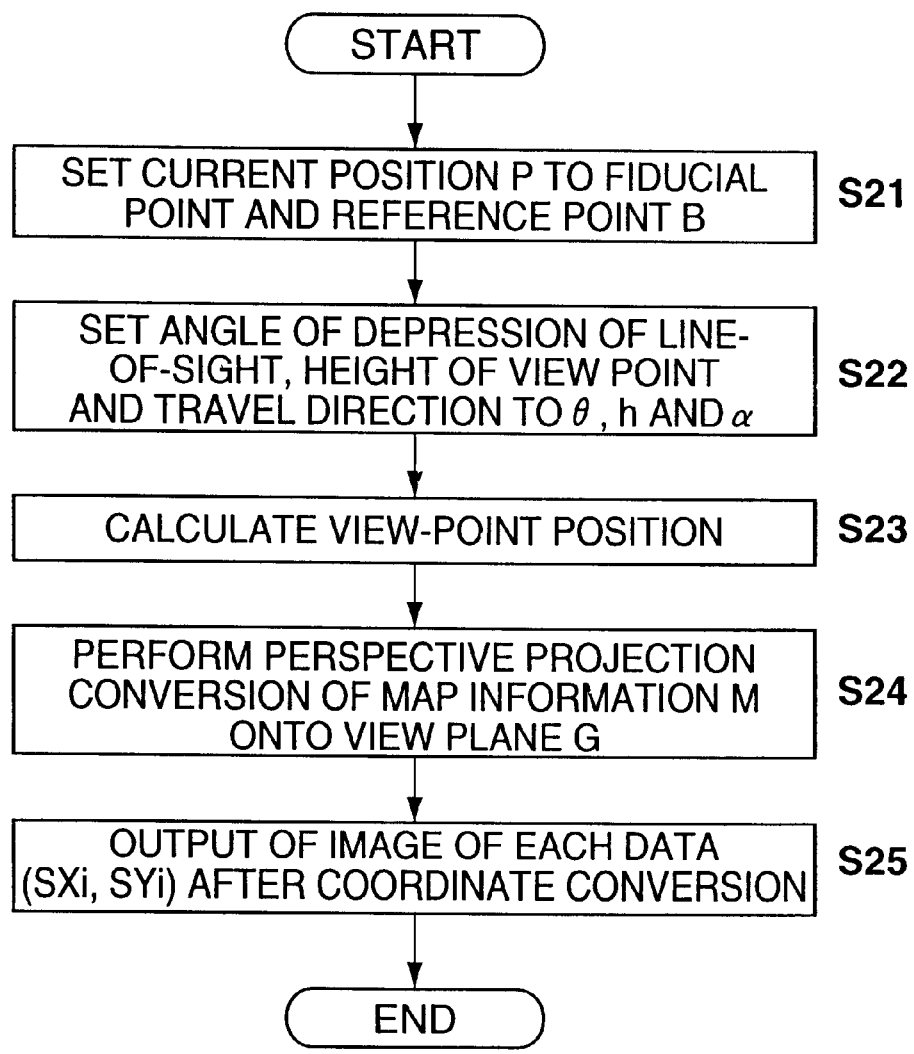
FIG. 16 is a flowchart showing the operation of the system shown in FIG. 14.

FIG. 16 is a flowchart showing the processing operation of the system shown in FIG. 14. This processing is implemented by the calculation of a general computer, and has a method of setting the current position $P_o$ as the view-point position E. and a method of setting the current position $P_o$ as the reference point B of the perspective projection. In this case, there will be described the case where the current position $P_o$ is set as the fiducial point Q, and the fiducial point Q is coincident with the reference point B.

First, by the view-point converting key input portion 42 and the current position input portion 41, in step S1 the current position $P_o$ is set as the fiducial point Q and the reference point B, and in step S22 the angle of depression of line-of-sight, the height of the view point and the travel direction are set to θ, h and α respectively.

Subsequently, the CPU 14 goes to step S23, and the view-point position is calculated from the following equation by the view-point position/line-of-sight direction determining portion 44. In this case, the view-point E can be determined on the basis of the information of the reference point B as follows. That is, assuming that the coordinate of the reference point B is set to (x, y, 0), the view point E ($X_0$, $Y_0$ and $Z_0$) can be represented as follows.

$$X_0 = x - h \times \cos \alpha(t)/\tan\theta$$

$$Y_0 = y - h \times \sin \alpha(t/\tan\theta$$

$$Z_0 = h$$

Subsequently, in step S24, the perspective projection is performed on the map data on the basis of the calculated view point by the graphic data coordinate converting portion 45. In this case, the relational expression of the coordinate conversion of the point M ($M_x$, $M_y$, $M_z$) on the XY plane onto the view plane G ($S_x$, $S_y$) is represented as follows. (In the case of a plane map, $M_z$ is equal to zero).

When [Equation 1]

$$\begin{pmatrix} E_x \\ E_y \\ E_z \\ 1 \end{pmatrix} = \begin{pmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{pmatrix} \begin{pmatrix} \sin\alpha(t) & -\cos\alpha(t) & 0 & 0 \\ \cos\alpha(t) & \sin\alpha(t) & 0 & 0 \\ 0 & 0 & 1 & 0 \\ 0 & 0 & 0 & 1 \end{pmatrix}$$

$$\begin{pmatrix} 1 & 0 & 0 & -X_0 \\ 0 & 1 & 0 & -Y_0 \\ 0 & 0 & 1 & -Z_0 \\ 0 & 0 & 0 & 1 \end{pmatrix} \begin{pmatrix} M_x \\ M_y \\ M_z \\ 1 \end{pmatrix}$$

$$S_x = E_x \times V_d / -E_z$$

$$S_y = E_y \times V_d / -E_z$$

$$S_z = 0$$

Subsequently, in step S25, the image data output portion 46 supplies each data point (Sxi, Syi) after the coordinate conversion to the image display portion 48, the image display portion 48 displays the image corresponding to the data points supplied from the image data output portion 46, and the processing is ended, whereby the map data which are represented with respect to the XY plane are perspectively projected onto the view plane G, and the bird's eye view is displayed.

In the above-described embodiment, a button for virtually advancing or moving backward may be separately provided, whereby a map can be viewed from any height.

In the above-described embodiment, the PCMCIA type HDD card is used as the storage device for storing information. However, a semiconductor memory or other storage devices may be used.

Further, the cursor and the menu may be moved by using an angle sensor for detecting the rotational angle only around the X-axis or the rotational angles around the X-axis and the Y-axis.

According to the information processing device and the information processing method as claimed herein, the displacement of the attitude of the housing due to the rotation of the whole housing is detected, selection information corresponding to the detected displacement is displayed in accordance with the operation by the instructing means, and when desired information is selected from the selection information which is indicated by the operation of the indicating means, the processing which is associated with the selected selection information is performed. Therefore, the infraction can be input by the rotational operation of the whole housing, so that the information can be input by one hand and the number of buttons can be reduced. Accordingly, the operability of the portable type equipment can be enhanced, and the equipment can be miniaturized.

What is claimed is:

1. An information processing device which is provided in a portable-size housing, comprising:
    display means for displaying information including selection information;
    detection means for detecting a rotation of the housing;
    instructions means for providing instructions for the selection of specific selection information displayed on the display means based on the rotation detected by the detection means; and
    processing means for processing the selection information which is selected by the instructing means, for controlling the display to display information associated with the selected selection information.

2. The information processing device as claimed in claim 1, wherein the selection information is a menu, and wherein the processing means controls the display means to move the menu displayed on the display means on the basis of the instructions provided by the instruction means and the rotation detected by the detection means.

3. The information processing device as claimed in claim 2, wherein the menu includes one or more items; and
    when an item is selected from the menu by the instructing means, the processing means performs processing relating to the selected item.

4. The information processing device as claimed in claim 1, wherein the information displayed by the display means is a map view; and
    the selection information selected by the instructing means, and processed by the processing means causes the display to move the map view displayed on the display means on the basis of the rotation detected by the detection means.

5. The information processing device as claimed in claim 4, wherein the selection information comprises areas from the plan map view, and wherein when the instructions means selects an area from the map view the processing means performs processing relating to the selected area.

6. The information processing device as claimed in claim 4, further comprising location detection means for detecting the current location of the device.

7. The information processing device as claimed in claim 6, wherein the location detection means detects the current location of the device by using a Global Positioning System.

8. The information processing device as claimed in claim 1, wherein the housing is designed in such a size as to be portable by one hand.

9. The information processing device as claimed in claim 1, wherein the detection means detects two components of rotation in two axial directions which are perpendicular to each other.

10. The information processing device as claimed in claim 1, wherein the detection means detects three components of rotation in three axial direction which are perpendicular to one another.

11. An information processing method for use in an information processing and display device which is provided in a portable-sized housing comprising the steps of:
    displaying information including selection information;
    detecting a rotation of the housing;
    selecting desired selection information based upon the detected rotation;
    performing processing relating to the selected selection information;
    displaying information corresponding to the selected information.

12. The information processing device of claim 1, wherein:
    the information processing device is portable by a single hand; and
    the instructing means may be controlled with a single finger or thumb of the single hand.

13. The information processing device of claim 2, wherein:
    the menu comprises one or more items;
    the processing means moves a cursor displayed on he display means from one item to another item of the menu based on the rotation detected by the detection means.

14. The information processing device of claim 4, wherein:
    the information processing device is portable by a single hand; and
    the instructing means may be controlled with a single finger or thumb of the single hand.

15. The information processing device of claim 4, wherein when no selection information has been selected by the instructing means, the map displayed on the display means is fixed according to the last selection information selected by the instructing means.

16. The information processing device of claim 4, wherein the display means is adapted to display a perspective view of the map from a view point selected by the instructing means.

17. The information processing device of claim 4, wherein the display means is adapted to display a bird's-eye view of the map from a view point selected by the instructing means.

18. The information processing device of claim 4, wherein the display means displays a destination location based on instructions from the instructing means.

19. The information processing device of claim 4, wherein the display means displayed the map from a series of predetermined view points according to a set of prior instructions by the instructing means.

20. The information processing device of claim 4, wherein:
    the instructing means is adapted to select a line of sight; and
    the display means is adapted to display the map as a projection into a view plane perpendicular to the selected line of sight.

21. The information processing device of claim 6, wherein the display means displays the location of the device on the map view in accordance with the location detected by the location detection means.

22. The information processing device of claim 6, wherein the display means displays a destination location based on selection information by selected the instructing means.

23. The method of claim 11, wherein:
the selection information is a menu;
the selecting step comprises selecting an item from the menu; and
the processing step comprises processing in accordance with the item selected from the menu.

24. The method of claim 11, wherein:
the information displayed is a map view;
the selecting step comprises selecting an area of the map to display and selecting the view point from which to display the map.

25. The method of claim 24, wherein the information processing device further comprises a location of the device.

26. The method of claim 11, wherein the information processing device is portable and sized to be held by a single hand.

27. The method of claim 26, wherein the information processing device is configured to be controlled with a single finger or thumb of the single hand.

28. The information processing device of claim 13, wherein when the cursor is located at a menu item, the item is emphasized.

29. The information processing device of claim 13, wherein:
when the cursor is located at a menu item, the instructing means may select the menu item; and
when the item is selected by the instructing means, the processing means performs processing relating to the selected menu item.

30. The method of claim 24, wherein the displaying step comprises displaying a perspective view of the map.

31. The method of claim 24, wherein the displaying step comprises displaying a bird's-eye view of the map.

32. The method of claim 24, wherein:
the selecting step comprises selecting a series of view points from which the may is to be displayed; and
the displaying step comprises displaying the map from each of the series of view points.

33. The method of claim 24, wherein:
the selecting step comprises selecting a destination location; and
the displaying step comprises displaying the destination location on the map.

34. The method of claim 24, wherein:
the displaying step comprises displaying the map from a range of view points, wherein each view point corresponds to a rotation angle of the housing detected in the detecting step.

35. The method of claim 24, wherein:
the selecting step comprises selecting a line of sight; and
the displaying step comprises displaying the map as a projection into a view plane perpendicular to the line of sight.

36. The method of claim 25, wherein the location detection means comprises a GPS system.

37. The method of claim 25, wherein the displaying step comprises displaying an area of the map corresponding to the location of the information processing device.

38. An information processing device, comprising:
a portable housing;
a monitor which is adapted to display information;
an angular velocity sensor which detects changes in the angular velocity of the housing, operates without reference to a direction of gravitational pull;
a control which is adapted to control the monitor and to select information displayed on the monitor, and which generates control signals; and
a processor which causes changes in the information displayed on the monitor after processing the control signals and the sensor signals.

39. The information processing device of claim 38, wherein:
the housing is portable and may be held by a single hand; and
the control is controllable with a single finger or thumb of the single hand.

40. The information processing device of claim 38, wherein:
the displayed information is a menu of one or more items; and
the processor is configured to display a cursor on the monitor which moves from one item to another item of the menu based on the rotation detected by the angular velocity sensor.

41. The information processing device of claim 40, wherein when the cursor is located at an item, that item is emphasized.

42. The information processing device of claim 40, wherein:
when the cursor is located at a menu item, the control may select the control may select that item; and
when the item is in fact selected by the control, the processor performs processing relating to the selected item.

43. The information processing device of claim 38, wherein the information displayed on the display is cartographic information.

44. The information processing device of claim 38, wherein the angular velocity sensor is a gyroscopic sensor.

45. The information processing device of claim 43, wherein the cartographic information is displayed in a map view.

46. The information processing device of claim 43, wherein the control is adapted to control the display of the cartographic information.

47. The information processing device of claim 45, wherein when the control generates a control signal, the processor controls the monitor to display the map view in accordance with the sensor signals.

48. The information processing device of claim 45, wherein:
the control is adapted to select an area from the map view; and
when an area from the map view is selected by the control, the processor performs processing related to the selected area.

49. The information processing device of claim 45, further comprising a location detector which detects the location of the device and generates location signals.

50. The information processing device of claim 45, wherein the monitor displays the cartographic information as a perspective map view.

51. The information processing device of claim 45, wherein the monitor displays the cartographic information as a bird's-eye map view.

52. The information processing device of claim 45, wherein the monitor displays the map view from a series of view points previously selected by the control.

53. The information processing device of claim 45, wherein the monitor displays a map projection onto a view plane perpendicular to a line of sight selected by the control.

54. The information processing device of claim 45, wherein the monitor displays a destination selected by the control.

55. The information processing device of claim 47, wherein the processor is configured such that, when the control ceases to generate a control signal, the processor controls the monitor to display a map view in accordance with the last sensor signal received by the processor prior to the cessation of control signal.

56. The information processing device of claim 49, wherein the location detector is a Global Positioning System detector.

57. The information processing device of claim 49, wherein the processor receives location signals from the location detector and controls the monitor to display an area of the map view corresponding to the location of the device.

58. The information processing device of claim 50, wherein the perspective view of the map is displayed from a view point selected by the control.

59. The information processing device of claim 51, wherein the bird's eye view of the map is displayed from a view point selected by the control.

60. An information processing device, comprising:
a portable housing;
a monitor which is adapted to display information including cartographic information;
a vibration gyro sensor which detects rotation of the housing and which generates sensor signals;
a control which is adapted to control the monitor and to select displayed information, and which generates control signals; and
a processor which causes changes in the cartographic information displayed by the monitor after processing the control signals and the sensor signals.

61. The information processing device of claim 60, wherein:
the housing is portable and adapted to be held in a single hand; and
the control is adapted to be operable by a single finger or thumb of said single hand.

62. The information processing device of claim 60, wherein:
the displayed information includes a menu of one or more items; and
the processor is configured to move a cursor displayed on the monitor from one item to another item of the menu based on the rotation detected by the detection means and control signals generated by the control.

63. The information processing device of claim 60, wherein when the cursor is located at an item, the item is emphasized.

64. The information processing device of claim 60, wherein:
the processor is configured such that when the cursor is located at a menu item, the item may be selected by the control; and
when an item is selected by the control, the processor performs processing relating to the selected item.

65. The information processing device of claim 60, wherein the sensor is a gyroscopic sensor.

66. The information processing device of claim 60, wherein the cartographic information is displayed in a map view.

67. The information processing device of claim 60, wherein the control is adapted to control the cartographic information.

68. The information processing device of claim 66, wherein when the control generates control signals, the processor controls the map view displayed on the monitor in accordance with the sensor signals.

69. The information processing device of claim 66, wherein:
the control is adapted to select an area from the map view; and
when the control selects an area from the map view, the processor performs processing related to the selected area.

70. The information processing device of claim 66, further comprising a location detector which detects the location of the device and generates location signals.

71. The information processing device of claim 66, wherein the monitor displays a perspective view of the map.

72. The information processing device of claim 66, wherein the monitor displays a bird'-eye view of the map.

73. The information processing device of claim 66, wherein the monitor displays the map view from a series of view points previously selected by the control.

74. The information processing device of claim 66, wherein the monitor displays a map projection onto a view plane perpendicular to a line of sigh selected by the control.

75. The information processing device of claim 66, wherein the monitor displays an area of the map view corresponding to a destination selected by the control.

76. The information processing device of claim 68, wherein when the control ceases to generate said control signals, the processor controls the monitor to display a map view in accordance with the last sensor signal received by the processor prior to the cessation of said control signals.

77. The information processing device of claim 70, wherein the location detector is a Global Positioning System detector.

78. The information processing device of claim 70, wherein the processor receives location signals from the location detector and controls the monitor to display a portion of the map view corresponding to the location of the device.

79. The information processing device of claim 71, wherein the perspective view of the map is drawn from a view point selected by the control.

80. The information processing device of claim 72, wherein the bird's eye view of the map is drawn from a view point selected by the control.

* * * * *